Sept. 5, 1950     W. E. ROBERTS     2,521,480
POULTRY BROODER

Filed April 21, 1949     2 Sheets-Sheet 1

INVENTOR
WILLIAM E. ROBERTS
BY Rice and Rice
ATTORNEYS

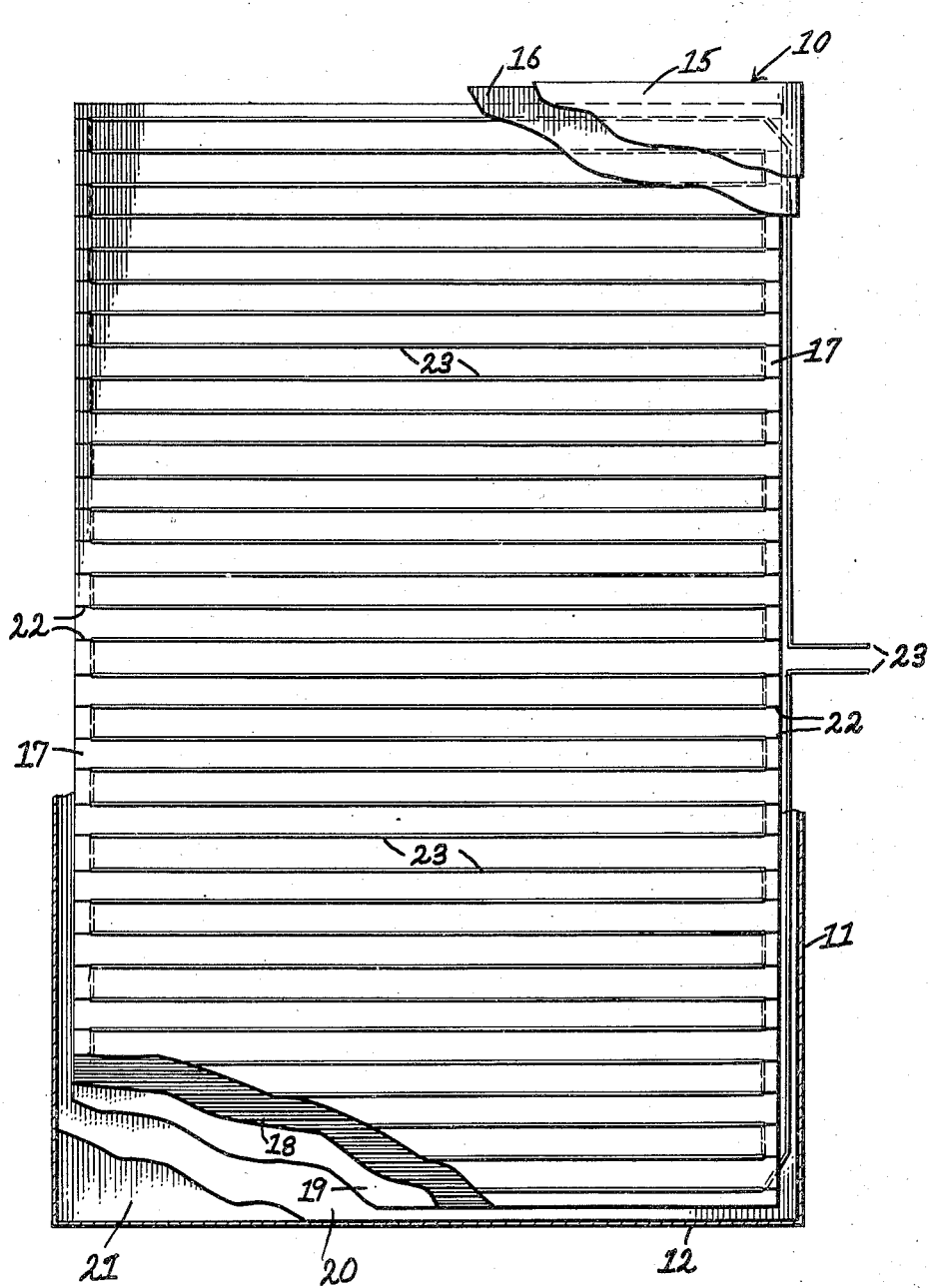

Patented Sept. 5, 1950

2,521,480

UNITED STATES PATENT OFFICE 2,521,480

POULTRY BROODER

William E. Roberts, Grand Rapids, Mich.

Application April 21, 1949, Serial No. 88,731

2 Claims. (Cl. 219—35)

1

The present invention relates to poultry brooders and more particularly to brooders which are electrically heated.

The primary objects of the instant invention are to provide a brooder of the general character above indicated whose floor is electrically heated and maintained at the proper temperature; to provide such a brooder whose heated floor is thus maintained in a dry condition thereby preventing so-called "brooder pneumonia" caused by the use of brooders having overhead heating arrangements with resultant moisture condensation on the floor, walls and/or ceiling; to provide such a brooder which requires neither the use of a thermometer nor a thermostatic control; to provide such a brooder having a slidably adjustable cover for ventilation purposes and for the comfort of the chicks; to provide such a brooder which is rugged and sturdy in construction yet which is light in weight and therefore readily portable; to provide such a brooder which is highly efficient in use; and, to provide such a brooder which is reasonably economical in both operation and in manufacture.

An illustrative embodiment of the invention is shown in the accompanying drawings, wherein:

Figure 6 is an enlarged top plan view of the bed of the brooder, the several layers forming the bed being broken away to show its successive layers.

Figure 1:
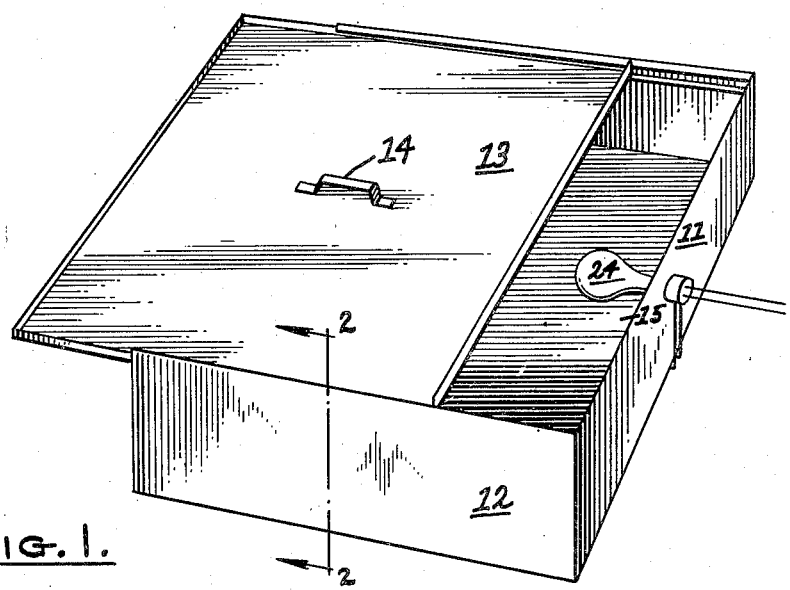
Figure 1 is a perspective view of the brooder.
Figure 2:
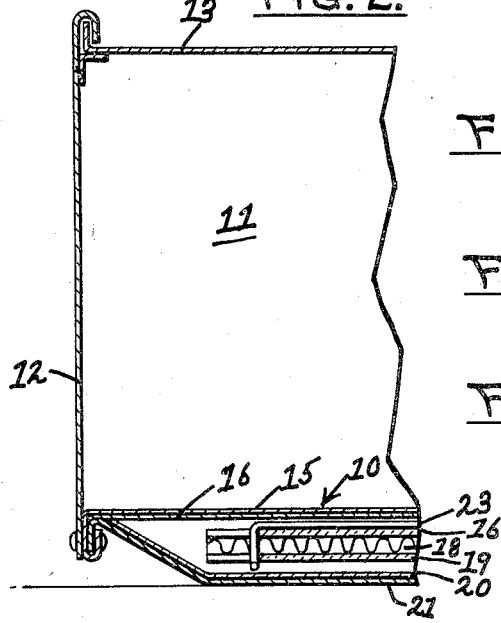
Figure 2 is an enlarged sectional view thereof on line 2—2 of Figure 1.

Referring then to the drawings wherein like parts of the brooder shown are designated by the same numerals in the several views, the same comprises a bed, generally designated 10, upwardly projecting side and end walls 11, 12 respectively and a slidably adjustable top or cover 13 to provide for ventilation and for comfort of the chicks, which top or cover is here shown as provided with a handle 14, the upper and bottom surfaces of the bed, side and end walls and the top being of any suitable material such as aluminum, galvanized sheet metal or the like.

2

The bed 10 comprises an upper layer 15 of a suitable material, below which is a layer of paper 16 preferably waterproofed in any conventional manner, thence a layer of asbestos 17 below which is a sheet of corrugated paper 18, thence another layer of asbestos sheeting 19 below which is second sheet of paper 20, likewise preferably waterproofed, and a bottom member 21 of suitable material.

The asbestos sheet 17 is here shown as provided along its opposite lengths with a plurality of equally spaced lateral slits 22 and a length of Nichrome wire 23 adapted to be connected with a suitable source of electric energy, not shown, is threaded back and forth in serpentine fashion within the slits 22 of the asbestos sheet 17 in the manner illustrated in Figure 6 which wiring when energized provides heat for the bed 10 to keep the same dry and to thereby prevent so-called "brooder pneumonia" which frequently occurs with the use of brooders having overhead heating and resultant moisture condensation within the confines of such a brooder.

Figure 3:
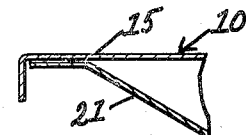
Figure 3 is a vertical sectional view showing the first step or operation by which the upper member of the bed is secured to the bottom member thereof.
Figure 4:
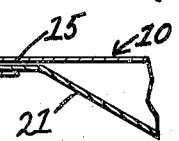
Figure 4 is a view similar to that of Figure 3 but showing the second step.
Figure 5:
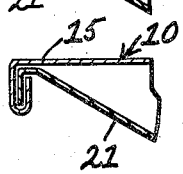
Figure 5 is a view similar to Figures 3 and 4 but showing the final step by which the upper member of the bed is secured to the bottom member thereof.

As shown in Figures 3-5, the upper surface 15 and bottom member 21 of the bed 10 are secured together with the several layers 16-20 disposed therebetween by first laterally bending the sheet 15 to its position shown in Figure 3, thence reversely bending the laterally bent portion over the under side of the bottom member 21 as shown in Figure 4 and finally bending the U-shaped bend of the upper member 15 and the embraced marginal lengths and widths of the lower member 21 as shown in Figure 5.

A brooder for chicks requires an approximate ninety-five degree (95°) temperature Fahrenheit and a bed twenty-three inches (23") by thirty-five inches (35") will be maintained at such approximate temperature by employing sixty-six feet (66') of number twenty-six (26) Nichrome wire threaded in the manner hereinbefore described thus eliminating the necessity of a thermostat or a thermometer.

An incandescent light bulb 24 of suitable voltage may be wired in parallel in the Nichrome wire circuit 23 to provide illumination for the chicks and the top or cover 13 may be slidably adjusted to provide ventilation and chick comfort as hereinbefore indicated.

It will thus be seen that the brooder floor herein shown and described is electrically heated and maintained at proper temperature thereby preventing so-called "brooder pneumonia" common in brooders having overhead heating arrangement with resultant moisture condensation on the floor, walls and/or ceiling and that the use of a thermometer or thermostat for controlling the heat is not required.

While but one specific embodiment of the invention has been herein shown and described, it will be understood that certain details of the construction shown may be altered or omitted without departing from the spirit of the invention as the same is defined in the following claims.

I claim:

1. A non-thermostatically controlled brooder having a dual spaced apart floor, side and end walls, the space between the dual floor having (1) a sheet of waterproofed paper, (2) an asbestos sheet, (3) a corrugated paper sheet, (4) a second asbestos sheet, and (5) a second sheet of waterproofed paper, said first mentioned asbestos sheet having a plurality of spaced lateral slits along two of its opposite sides, and a Nichrome wire threaded back and forth in serpentine fashion within said slits of a length and size for maintaining the floor temperature at an approximate ninety-five degree temperature Fahrenheit when electrically energized.

2. A heating structure having a dual spaced apart floor, the space between the dual floor having (1) a sheet of waterproofed paper, (2) an asbestos sheet, (3) a corrugated paper sheet, (4) a second asbestos sheet, and (5) a second sheet of waterproofed paper, said first mentioned asbestos sheet having a plurality of spaced lateral slits along two of its opposite sides, and a Nichrome wire threaded back and forth in serpentine fashion within said slits of a length and size for maintaining the floor temperature at an approximate ninety-five degree temperature Fahrenheit when electrically energized.

WILLIAM E. ROBERTS.

REFERENCES CITED

The following references are of record in the file of this patent:

UNITED STATES PATENTS

| Number | Name | Date |
| --- | --- | --- |
| 1,381,109 | De Khotinsky | June 14, 1921 |
| 1,755,520 | Shoup et al. | Apr. 22, 1930 |
| 2,312,257 | Mahlstadt | Feb. 23, 1943 |
| 2,493,542 | McGraw | Jan. 3, 1950 |

FOREIGN PATENTS

| Number | Country | Date |
| --- | --- | --- |
| 286,807 | Great Britain | Mar. 15, 1928 |
| 615,069 | Great Britain | Dec. 31, 1948 |